C. A. EDLUND, DEC'D.
H. EDLUND, ADMINISTRATRIX & J. DORAN, ADMINISTRATOR, DE BONIS NON.
AUTOMATIC FEED REGULATING FLOAT FOR CENTRIFUGAL SEPARATORS.
APPLICATION FILED DEC. 22, 1906. RENEWED NOV. 9, 1908.
916,398.
Patented Mar. 23, 1909.
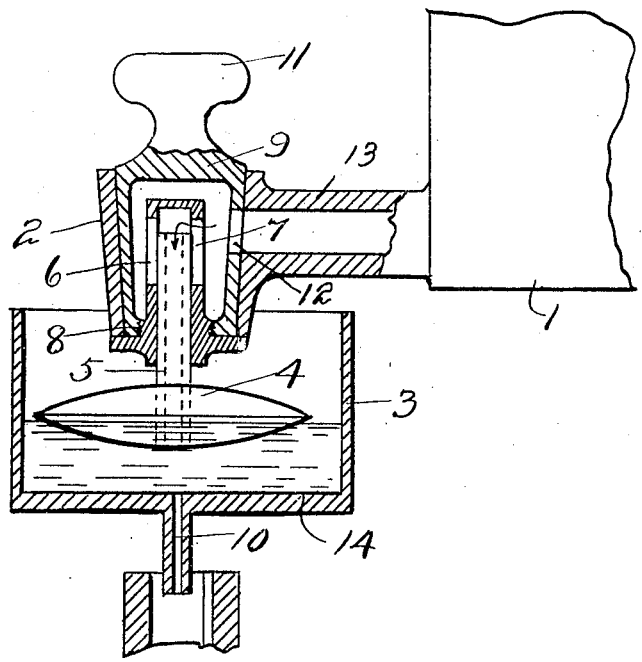
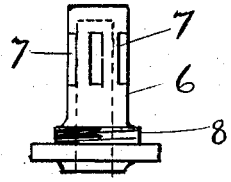
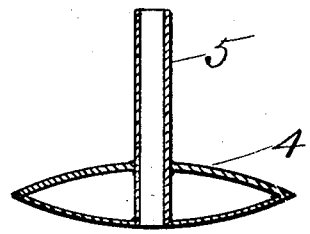
Witnesses
Frank A. Foster
E. D. Ogden
Inventor:
Hanna Edlund,
Administratrix of Estate of
Claus A. Edlund.
By Howard E. Barlow
Attorney

UNITED STATES PATENT OFFICE.

HANNA EDLUND, OF PROVIDENCE, RHODE ISLAND, ADMINISTRATRIX OF CLAUS A. EDLUND, DECEASED; JOHN DORAN, ADMINISTRATOR DE BONIS NON OF SAID CLAUS A. EDLUND, DECEASED, ASSIGNOR OF ONE-HALF TO EMIL BERNSTROM, OF PROVIDENCE, RHODE ISLAND.

AUTOMATIC FEED-REGULATING FLOAT FOR CENTRIFUGAL SEPARATORS.

No. 916,398.     Specification of Letters Patent.     Patented March 23, 1909.

Application filed December 22, 1906, Serial No. 349,021. Renewed November 9, 1908. Serial No. 461,807.

*To all whom it may concern:*

Be it known that CLAUS A. EDLUND, late of the city and county of Providence and State of Rhode Island, made certain new and useful Improvements in Automatic Feed-Regulating Floats for Centrifugal Separators, for which an application is hereby prepared, executed, and filed by HANNA EDLUND, administratrix of the estate of the said CLAUS A. EDLUND, deceased, of which the following is a specification.

This invention relates to automatic feed regulating floats for centrifugal separators and has for its object to provide a float that will automatically shut off the supply of liquid from the main supply tank allowing the liquid to be supplied to the machine only as fast as it is required.

An essential feature of this device is that the liquid flows through the center of the float thereby obviating any effect that the same would have if it fell on the outside of the float as is customary in this class of supply controlling device.

Another feature of the invention is that the pressure of the liquid is balanced against the reciprocating stem of the float as said pressure is admitted to said stem on opposite sides through suitable apertures in the casing, thus allowing the float a free vertical movement.

The invention consists of other novel features as will be fully described hereinafter and then pointed out in the appended claim.

A practical embodiment of the invention is represented in the accompanying drawings, forming a part of this specification in which similar characters of reference indicate corresponding parts in all the views.

In the drawings: Figure 1— represents the float supported in its feeder tank and the supply receptacle and supply cock through which the liquid enters. Fig. 2— is a detail view of the regulating float in section. Fig. 3— is a detail in elevation of the perforated bearing or casing in which the tubular stem is adapted to work vertically.

Referring to the drawings, the milk is fed from the supply receptacle 1 through the plug cock 2 into the feeder tank 3, whence it is designed to flow at a predetermined velocity through small aperture 10 into the centrifugal separating bowl below, not shown. In this tank 3 is located a float having a hollow stem 5 through which the milk is designed to pass. This float may be made of cork or wood, or it may be constructed hollow of metal or of any other desired material. The hollow stem 5 in this float is made in a tubular form and is held to reciprocate vertically in a bearing or casing 6 which casing is threaded at 8 into the hollow plug cock 9, said casing being slotted at 7—7 all around its periphery to admit the liquid therethrough and balance the pressure against the reciprocating stem by admitting the liquid on all sides at once.

Slotted holes have been shown in the casing 7 admitting the milk down through the end of the tubular stem, but holes may also be made through the walls of the stem to register with smaller holes in the casing for admitting the liquid, if desired.

The plug cock 9 is made hollow and is provided with a handle 11 by which it is rotated in its casing 2 to admit the liquid therein when its aperture 12 registers with that in the inlet pipe 13.

In the operation of the device when it is desired to admit the milk from the receptacle 1 to the centrifugal bowl the handle 11 of the plug cock is turned to admit the milk into the same which at once passes through the slots 7—7 in the casing 6 and down through the hollow stem 5 of the float which at that time rests on the bottom 14 of the feeder tank 3, the hole in said stem registering with the outlet hole 10. If the milk enters through the float faster than it is permitted to pass to the separator bowl below through this small aperture 10 it necessarily accumulates in said tank and raises the float thereby forcing upward the tube 5 in its casing and automatically closing the apertures 7 thus shutting off and automatically regulating the supply of milk to said tank by the position of the float in the same. This float is very simple and practical in construction and effective in its operation.

Having thus described this invention, what is claimed as new and desired to be secured by Letters Patent, is:

In a device of the character described, a supply receptacle, a plug cock by which the supply from said receptacle may be shut off, a casing secured to said cock, said casing being provided with inlet apertures, a feeder tank, a float in said tank, a stem in said float, said stem being adapted to work vertically in said casing to close and open said apertures as the float rises and falls, said stem and float being provided with a central supply aperture through which the liquid enters the tank.

In testimony whereof I affix my signature in presence of two witnesses.

HANNA EDLUND,
*Administratrix of the estate of Claus A. Edlund.*

Witnesses:
JOHN ERIKSON,
HOWARD E. BARLOW.